United States Patent [19]

Ogura et al.

[11] Patent Number: 5,311,317

[45] Date of Patent: May 10, 1994

[54] VIDEO SIGNAL PROCESSING APPARATUS FOR DISPLAYING STORED VIDEO SIGNAL DURING CHANNEL SELECTION

[75] Inventors: Toshiyuki Ogura, Tokyo; Osamu Sugiyama, Kanagawa, both of Japan

[73] Assignee: Sony Corporation, Tokyo, Japan

[21] Appl. No.: 868,241

[22] Filed: Apr. 14, 1992

[30] Foreign Application Priority Data

Apr. 19, 1991 [JP] Japan ............... 3-088754

[51] Int. Cl.$^5$ ............... H04N 5/44; H04N 7/01; H04N 5/50
[52] U.S. Cl. ............... 340/725; 348/441; 348/731
[58] Field of Search ............... 358/181, 191.1, 195.1, 358/188, 22, 192.1, 185, 140; H04N 5/50, 5/44, 7/01

[56] References Cited

U.S. PATENT DOCUMENTS

| | | | |
|---|---|---|---|
| 4,853,765 | 8/1989 | Katsuma et al. | 358/11 |
| 4,855,833 | 8/1989 | Kageyama et al. | 358/181 |
| 5,134,479 | 7/1992 | Ohishi | 358/140 |
| 5,150,200 | 9/1992 | Hong | 358/188 |
| 5,168,362 | 12/1992 | Yoshida | 358/140 |

FOREIGN PATENT DOCUMENTS

| | | | |
|---|---|---|---|
| 60-235592 | 4/1986 | Japan | H04N 5/44 |
| 0145972 | 6/1987 | Japan | H04N 5/44 |
| 63-078680 | 4/1988 | Japan | H04N 5/45 |
| 0122373 | 5/1988 | Japan | H04N 5/44 |
| 0276386 | 11/1988 | Japan | H04N 5/44 |
| 0151887 | 6/1989 | Japan | H04N 7/01 |
| 0212085 | 8/1989 | Japan | H04N 5/44 |
| 0233888 | 9/1989 | Japan | H04N 7/01 |
| 1286587 | 2/1990 | Japan | H04N 5/44 |
| 0191682 | 8/1991 | Japan | H04N 5/44 |
| 2219463 | 12/1989 | United Kingdom | H04N 5/262 |
| 2221363 | 1/1990 | United Kingdom | H04N 5/50 |

*Primary Examiner*—Mark R. Powell
*Assistant Examiner*—John W. Miller
*Attorney, Agent, or Firm*—Lewis H. Eslinger; Jay H. Maioli

[57] ABSTRACT

A video signal processing apparatus in which a video signal channel-selected and received by a tuner is supplied through a switch to a video output circuit and a signal from the video output circuit is supplied to a cathode ray tube (CRT), thereby being displayed on a picture screen of the CRT. Also, the video signal from the tuner is supplied to a video memory of one frame, for example, and an output of the video memory is supplied to the switch. Further, the video signal from the tuner is supplied to a non-signal detecting circuit and a control signal from the non-signal detecting circuit is supplied to the video memory and the switch. Then, when there is no video signal, the switch is changed in position to allow the signal stored in the video memory to be output. Therefore, a picture displayed in the absence of video signal can be stabilized.

3 Claims, 3 Drawing Sheets

VIDEO SIGNAL PROCESSING APPARATUS FOR DISPLAYING STORED VIDEO SIGNAL DURING CHANNEL SELECTION

BACKGROUND OF THE INVENTION

1. Field of the Invention

The present invention relates generally to video signal processing apparatus and, more particularly to a video signal processing apparatus for use in video monitor apparatus, such as a television receiver or the like.

2. Description of the Related Art

In video monitor apparatus such as a television receiver or the like, it is frequently observed that, when a supply of a video signal to be displayed thereon is interrupted a picture screen is disturbed and the brightness of the picture screen is changed considerably. More specifically, when a reception channel of a television receiver, for example, is switched, a synchronization disorder and a fluctuation of the brightness of the picture screen or the like occur until the channel-selection or tuning operation is finished. During such tuning operation the picture screen becomes quite unstable. As a result, there arise the following disadvantages:

(1) A picture is difficult to see;
(2) A circuit is stressed;
(3) A superimposed video signal such as a display on the picture screen and a superimposed picture of a so-called picture-in-picture, become unstable so that the picture is difficult to see or its content cannot be discriminated.

Further, when there is not a video signal, a vertical oscillation becomes a free running oscillation and a free running frequency is generally set to be lower than a normal frequency. As a consequence, a vertical amplitude is extended and it is frequently observed that a superimposed video signal such as a display area provided on the upper and lower ends of the picture, that is a superimposed picture of a picture-in-picture system, is displayed on the outside of the picture screen and cannot be correctly displayed.

According to the conventional video signal processing apparatus, in order to eliminate the above-mentioned disadvantages, the picture screen is processed by a blanking process when an input video signal is switched, for example, so as to prevent a unstable picture from being displayed on the picture screen. However, this proposal has the following disadvantages:

(1) A stress applied to the circuit by the synchronization disturbance cannot be alleviated;
(2) Nothing is displayed on the picture screen and this condition cannot be distinguished from the condition that a video apparatus is turned off;
(3) A variety of superimposed video signals cannot be seen; and
(4) Operation conditions of the video apparatus cannot be understood.

OBJECTS AND SUMMARY OF THE INVENTION

Therefore, it is an object of the present invention to provide an improved video signal processing apparatus in which the aforesaid shortcomings and disadvantages encountered by use of the prior art can be eliminated.

More specifically, it is an object of the present invention to provide a video signal processing apparatus in which the quality of a picture displayed when there is not an input video signal in the tuning mode or the like can be improved.

It is another object of the present invention to provide a video signal processing apparatus in which a superimposed video signal, such as a video signal for display of a message on the picture screen, a video signal for picture-in-picture mode, or the like can be stabilized.

It is still another object of the present invention to provide a video signal processing apparatus in which a stress applied to a circuit can be alleviated.

It is a further object of the present invention to provide a video signal processing apparatus by which a stable picture can be obtained constantly.

According to a first aspect of the present invention, a video signal processing apparatus is comprised of a circuit for receiving a video signal, a memory for storing a signal having a horizontal synchronizing (sync.) signal and a vertical sync. signal from the receiving circuit, a switching circuit for transmitting the video signal from the receiving circuit or the signal stored in the memory, a detecting circuit for detecting whether or not there is the video signal output from the receiving circuit and controlling the change of the switching circuit so that the signal having a horizontal sync. signal and a vertical sync. signal stored in the memory is transmitted when there is not a video signal in the signal output from the receiving circuit, and a circuit for supplying the video signal from the receiving circuit or the signal from the memory to a cathode ray tube (CRT).

According to a second aspect of the present invention, a video signal processing apparatus is comprised of a circuit for receiving a video signal, a memory for storing a signal having a horizontal synchronizing (sync.) signal and a vertical sync. signal from the receiving circuit, a switching circuit for transmitting the video signal from the receiving circuit or the signal stored in the memory, a control circuit, responsive to a channel tuning signal for supplying a control signal to the receiving circuit, the memory, a switching circuit so that the receiving circuit tunes a desired channel and the switching circuit transmits the signal stored in the memory during a prescribed period, and a circuit for supplying the video signal from the receiving circuit or the signal from the memory to a cathode ray tube (CRT).

In accordance with a third aspect of the present invention, a video signal processing apparatus for an extended definition television (EDTV) is comprised of a circuit for receiving a video signal, a circuit for changing a frequency of the video signal into a frequency of scanning lines for the EDTV, a circuit for supplying the signal having a changed frequency and stored in a memory to a cathode ray tube (CRT), and a detecting circuit for detecting whether or not there is the video signal in the signal output from the receiving circuit and keeping the signal in the memory on a still condition when there is not the video signal in the signal output from the receiving circuit.

BRIEF DESCRIPTION OF THE DRAWINGS

A better understanding of other objects, features, and advantages of the invention can be gained from a consideration of the following detailed description of illustrative embodiments thereof, in conjunction with the figures of the accompanying drawings, in which.

DESCRIPTION OF THE PREFERRED EMBODIMENTS

The present invention will now be described with reference to the drawings.

Figure 1:
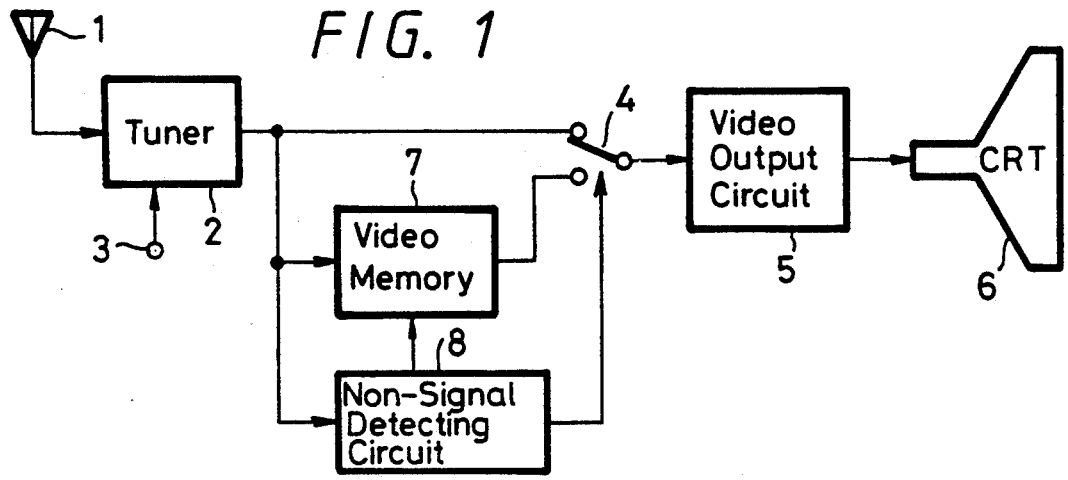
FIG. 1 is a block diagram showing a first embodiment of a video signal processing apparatus according to the present invention.

FIG. 1 of the accompanying drawings shows a first embodiment of the present invention. Referring to FIG. 1, a signal received at an antenna 1 is supplied to a tuner 2 which selects and receives a desired channel of a video signal in response to a channel-selection signal from a channel-selection input terminal 3. The video signal selected and received by the tuner 2 is supplied through a switch 4 to a video output circuit 5 and a signal from the video output circuit 5 is supplied to a cathode ray tube (CRT) 6, whereby a picture is displayed on a picture screen of the CRT 6. The video signal from the tuner 2 is also supplied to a one-frame video memory 7, for example, and an output of this video memory 7 is supplied to the switch 4. Further, the video signal from the tuner 2 is supplied to a non-signal detecting circuit 8 and a control signal from the non-signal detecting circuit 8 is supplied to the video memory 7 and the switch 4.

In the above-mentioned video signal processing apparatus, if it is determined by the non-signal detecting circuit 8 that there is no video signal in the output from the tuner 2, then the following process is carried out:

(1) Continuously store a video signal in the video memory 7 (video signal might be a noise in the non-signal mode);

(2) Connect the switch 4 to the video memory 7 side;

(3) Determine at a certain time interval whether or not there is a video signal in the output from the tuner; and (4) Connect the switch 4 to the tuner 2 side when there is a video signal in the output from the tuner 2.

Thus, a stable video signal is constantly output to the video output circuit 5.

In this video signal processing apparatus, when the output of the video memory 7 and the signal from the tuner 2 are not coincident with each other in synchronization, a picture displayed on the picture screen is temporarily disturbed, which disturbance occurs during a very short period of time, raising no problem. Further, in this video signal processing apparatus, a message indicative of the non-signal state might be displayed on the picture screen during the switch 4 is connected to the video memory 7 side. Furthermore, if the switch 4 is changed in position in a manual fashion, then the user can confirm the present condition of the signal by connecting the switch 4 to the tuner 2 side in a manual fashion.

As described above, according to the video signal processing apparatus of the first embodiment, since the signal stored in the video memory 7 is output to the video output circuit 5 by the switch 4 during the period when the absence of the video signal is detected by the non-signal detecting circuit 8, a disturbed video signal can be inhibited from being output so that a stable picture can be obtained constantly.

Figure 2:
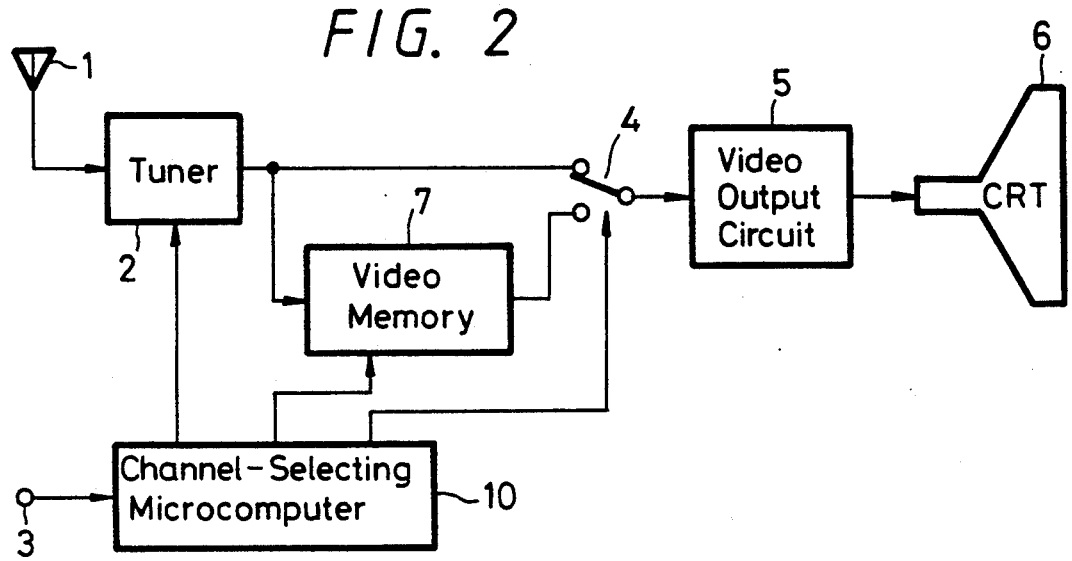
FIG. 2 is a block diagram showing a second embodiment of a video signal processing apparatus according to the present invention.

FIG. 2 shows in block form a second embodiment of the present invention. In FIG. 2, like parts corresponding to those of FIG. 1 are marked with the same references and therefore need not be described in detail.

As shown in FIG. 2, the signal received at the antenna 1 is supplied to the tuner 2. The channel-selection instruction signal from the channel-selection input terminal 3 is supplied to a channel-selection microcomputer 10 and a control signal from the channel-selection microcomputer 10 is supplied to the tuner 2. Then, a desired channel of a video signal is selected and received by the tuner 2 in response to the control signal from the channel-selection microcomputer 10. A video signal selected and received by the tuner 2 is supplied through the switch 4 to the video output circuit 5 and a signal from the video output circuit 5 is supplied to the CRT 6, whereby a picture is displayed on the picture screen of the CRT 6. The video signal from the tuner 2 is also supplied to the one frame memory 7, for example, and an output of the video memory 7 is supplied to the switch 4. Further, the control signal from the channel-selection microcomputer 10 is supplied to the video memory 7 and the switch 4.

In this video signal processing apparatus, when the channel-selection instruction signal from the channel-selection input terminal 3 is supplied to the channel-selection microcomputer 10, then the following process is carried out:

(1) Store a video signal in the video memory 7;

(2) Connect the switch 4 to the video memory 7 side;

(3) Start the channel-selection operation of the tuner 2;

(4) Confirm that the apparatus is set in the stable reception state after the automatic fine tuning (AFT) operation is ended or confirm that a predetermined period of time is passed since the channel-selection operation has been started;

(5) Process the output to the video output circuit 5 in a blanking processing fashion;

(6) Connect the switch 4 to the tuner 2 side; and (7) Release the output blanking to the video output circuit 5.

According to the above-mentioned process a stable video signal is constantly output to the video output circuit 5. The reason that the predetermined period of time is set in the above item (4) is to indicate the non-signal channel because the AFT operation is not always finished when the non-signal channel is selected.

In this video signal processing apparatu ;, when the output of the video memory 7 and the signal from the tuner 2 are not coincident with each other in synchronization, a picture displayed on the picture screen is temporarily disturbed, which disturbance occurs during a very short period of time, raising no problem. Further, in this video signal processing apparatus, a message indicative of the channel-selection operation might be displayed on the picture screen during the switch 4 is connected to time when video memory 7 side. Furthermore, if the switch 4 is changed in position in a manual fashion, then the user can confirm the present condition of the signal by connecting the switch 4 to the tuner 2 side in a manual fashion.

As described above, according to the video signal processing apparatus of the second embodiment, since the signal stored in the video memory 7 is output through the switch 4 by the channel-selection microcomputer 10 during the non-signal period of the video signal (during the tuning period), a disturbed video signal can be inhibited from being output so that a stable picture can be obtained constantly.

Figure 3:
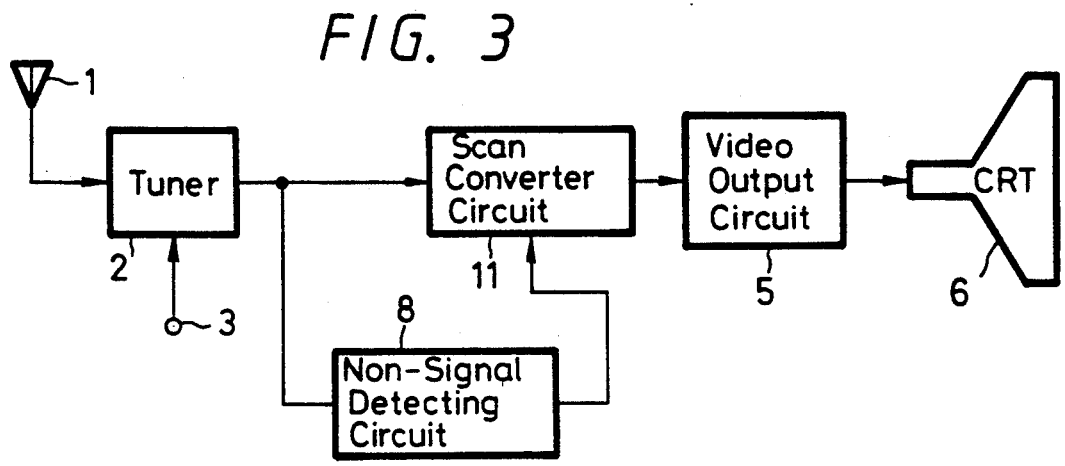
FIG. 3 is a block diagram showing a third embodiment of a video signal processing apparatus according to the present invention.

FIG. 3 shows in block form a third embodiment of the present invention in which the video signal processing apparatus is applied to a so-called extended definition television (EDTV). In FIG. 3, like parts corresponding to those of FIGS. 1 and 2 are marked with the same references and therefore need not be described in detail.

In this embodiment, as shown in FIG. 3, the signal received at the antenna 1 is supplied to the tuner 2 which selects and receives the desired channel of a video signal in response to the signal from the channel-selection input terminal 3. The video signal thus selected and received by the tuner 2 is supplied to a scan converter circuit 11 which converts the scanning lines into those of the EDTV. A signal from the scan converter circuit 11 is supplied to the video output circuit 5 and a signal from the video output circuit 5 is supplied to the CRT 6, whereby a picture is displayed on the picture screen of the CRT 6. Further, the video signal from the tuner 2 is also supplied to the non-signal detecting circuit 8 and a control signal from the non-signal detecting circuit 8 is supplied to the scan converter circuit 11.

According to the video signal processing apparatus of the third embodiment, when it is determined by the non-signal detecting circuit 8 that there is no video signal in the output signal thus selected and received by the tuner 2, then the following process is carried out:

(1) Set the video memory of the scan converter circuit 11 to the still image mode;
(2) Determine at a certain interval whether or not there is a video signal in the output from the tuner 2; and
(3) Set the video memory of the scan converter circuit 11 to the normal mode when there is a video signal in the output from the tuner 2.

According to the above-mentioned process, the stable video signal can be constantly output to the video output circuit 5.

Figure 4:
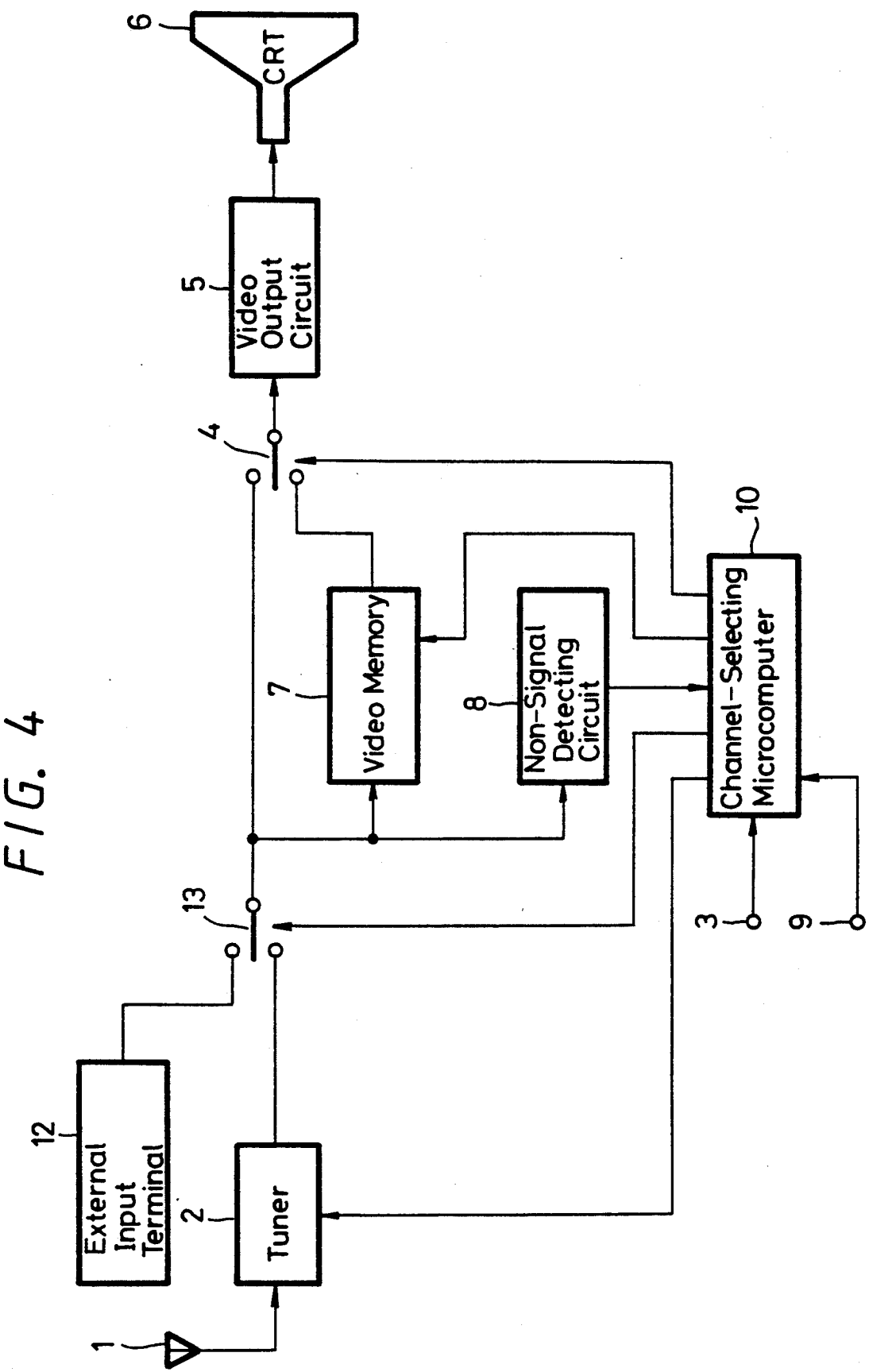
FIG. 4 is a block diagram showing a fourth embodiment of a video signal processing apparatus according to the present invention.

Further, FIG. 4 shows a fourth embodiment of the present invention in which the first and second embodiments are combined and which is provided with an external input terminal 12 supplied with a video signal from a video tape recorder (VTR) or the like. Also in FIG. 4, like parts corresponding to those of FIGS. 1 and 2 are marked with the same references and therefore need not be described.

Referring to FIG. 4, a selection signal from an input selection terminal 9 is supplied to the channel-selection microcomputer 10 so that, when the tuner 2 is selected, then the control signal from the channel-selection microcomputer 10 is supplied to the tuner 2 and to a switch 13 for selecting the output signal from the tuner 2 or the input signal from the external input terminal 12. When the external input terminal 12 is selected, then the switch 13 is connected to the external input terminal 12 side by the channel-selection microcomputer 10. Further, the channel selection microcomputer 10 responds to the signal from the non-signal detecting circuit 8 to output the video signal (or a noise in the non-signal mode) that has come from the tuner 2 and was stored in the video memory 7 or the video signal from the external input terminal 12 and also connects the switch 4 to the video memory 7 side. Thus, when the selection of the input signal is switched, the control in which the channel-selection signal is input in the non-signal mode and the control in which the non-signal mode is detected by the non-signal detecting circuit 8 are reliably carried out under the control of the microcomputer 10, thereby the displayed picture being stabilized.

Figure 5:
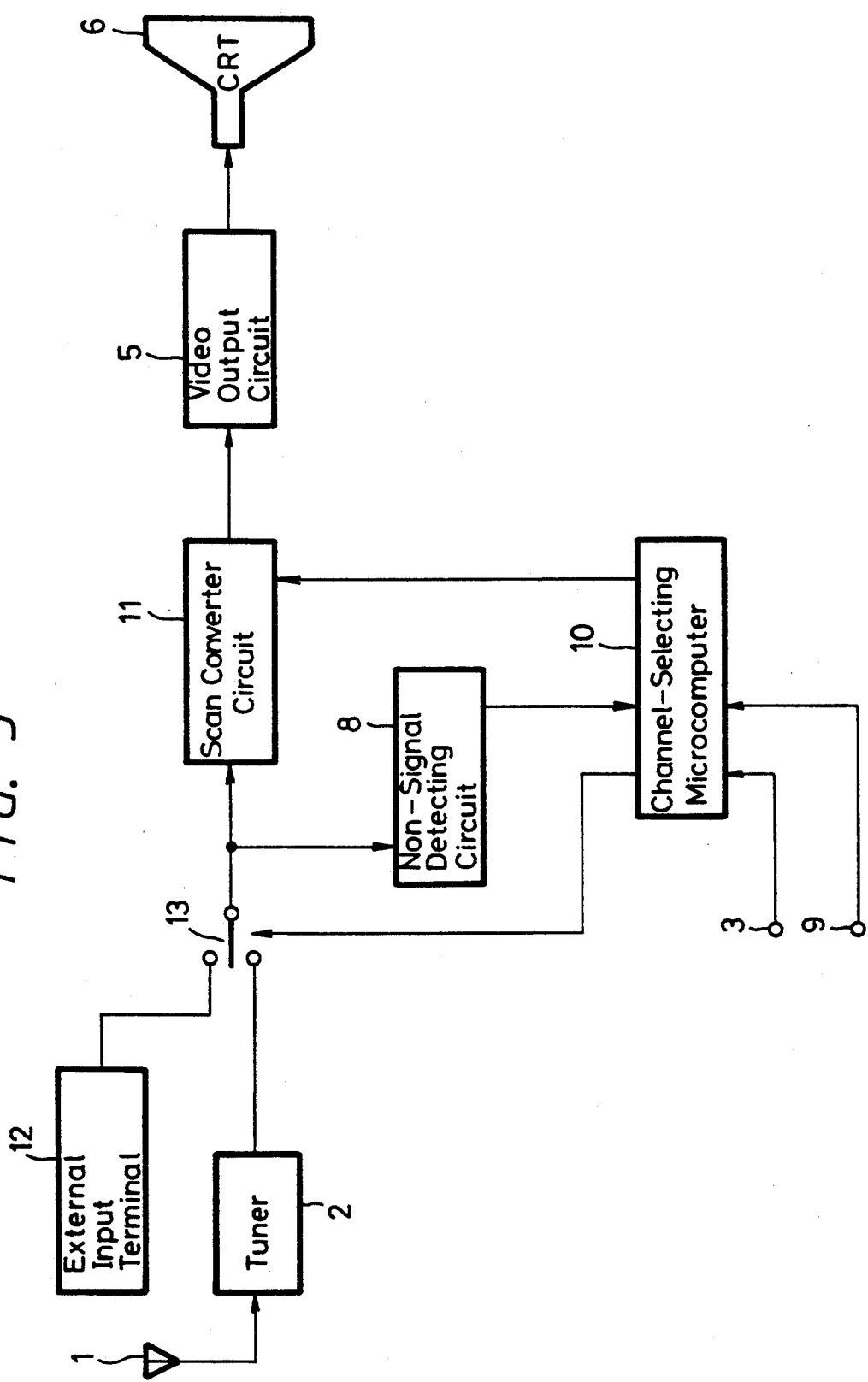
FIG. 5 is a block diagram showing a video signal processing apparatus according to a fifth embodiment of the present invention in which the fourth embodiment is applied to the third embodiment.

FIG. 5 shows a video signal processing apparatus according to a fifth embodiment of the present invention in which the idea of the fourth embodiment is applied to the third embodiment. In FIG. 5, like parts corresponding to those of FIGS. 3 and 4 are marked with the same references and therefore need not be described in detail. Also in the fifth embodiment, as shown in FIG. 5, since the scan converting circuit 11 is controlled by effectively utilizing the channel-selection microcomputer 10, the control in the non-signal mode can be effected reliably and the displayed picture can be stabilized similarly to the fourth embodiment.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A video signal processing apparatus comprising:
   receiving means for receiving a video signal;
   a memory for storing a video signal having a horizontal synchronizing signal and a vertical synchronizing signal from said receiving means;
   switching means for selectively transmitting said video signal form said receiving means or said video signal stored in said memory;
   a non-signal detecting circuit connected to an output of said receiving means and producing an output signal indicating whether a video signal is received;
   control means responsive to user input of channel selection information for supplying a control signal to said receiving means, said memory, and said switching means so that said receiving means tunes a desired channel and said switching means transmits said video signal stored in said memory during a prescribed period, such that after said period expires said switching means again transmits said video signal from said receiving means, said control means being further responsive to said output signal from said non-signal detecting circuit to control said switching means to transmit said video signal stored in said memory when a non-signal condition is detected by said non-signal detecting circuit; and
   means for supplying said video signal from said receiving means or said video signal from said memory to a display.

2. The video signal processing apparatus according to claim 3, further comprising means for informing a user that the video signal stored in said memory is being transmitted.

3. A video signal processing apparatus for a television receiver displaying signals of the extended definition television system comprising:
   receiving means for receiving a video signal;

scan line converter means including memory means for changing a scan lien frequency of said video signal into a scan line frequency of said extended definition television system and storing a frame of a converted signal in the memory means;

means for supplying said signal having a changed scan line frequency and stored in the memory means to a display;

external signal input means for receiving an external video signal;

switching means for selectively transmitting said video signal from said receiving means or said external video signal received by said external signal input means to said scan line converter means;

a non-signal detecting circuit connected to an output of said switching means and producing an output signal indicating whether a video signal is present at said output of said switching means; and control means responsive to user input of input signal information for supplying a control signal to said switching means and to said memory means so that said switching means switches between said receiving means and said external signal input means and said memory means transmits said video signal stored therein to said means for supplying during a prescribed period, such that after said period expires said memory means no longer transmits said video signal stored therein to said means for supplying, said control means being further responsive to said output signal form said non-signal detecting circuit to control said switching means to transmit said video stored in said memory means of said scan line converter when a non-signal condition is detected by said non-signal detecting circuit.

* * * * *

UNITED STATES PATENT AND TRADEMARK OFFICE
CERTIFICATE OF CORRECTION

PATENT NO. : 5,311,317
DATED : May 10, 1994
INVENTOR(S) : Toshiyuki Ogura and Osamu Sugiyama It is certified that error appears in the above-indentified patent and that said Letters Patent is hereby corrected as shown below:

Col. 1, line 27, after "signal" insert --,--
         line 44, after "disadvantages" change "." to --,--
Col. 4, line 49, after "process" insert --,--

In the Claims:

Col. 6, line 38, change "form" to --from--
         line 62, change "claim 3" to --claim 1--
Col. 7, line 2, change "lien" to --line--
Col. 8, line 14, change "form" to --from--

Signed and Sealed this

Sixth Day of June, 1995

Attest:

BRUCE LEHMAN

Attesting Officer            Commissioner of Patents and Trademarks